(12) United States Patent
Salinas et al.

(10) Patent No.: US 7,945,953 B1
(45) Date of Patent: May 17, 2011

(54) METHOD TO IDENTIFY BUFFER OVERFLOWS AND RLIBC ATTACKS

(75) Inventors: Govind Salinas, Sunnyvale, CA (US); Matthew Conover, East Palo Alto, CA (US); Sourabh Satish, Fremont, CA (US)

(73) Assignee: Symantec Corporation, Mountain View, CA (US)

( * ) Notice: Subject to any disclaimer, the term of this patent is extended or adjusted under 35 U.S.C. 154(b) by 1225 days.

(21) Appl. No.: 11/176,855

(22) Filed: Jul. 6, 2005

(51) Int. Cl.
*H04L 29/00* (2006.01)

(52) U.S. Cl. ............... 726/22; 726/23; 726/24; 726/25

(58) Field of Classification Search ............. 726/22–26; 713/187–191
See application file for complete search history.

(56) References Cited

U.S. PATENT DOCUMENTS

| | | | | |
|---|---|---|---|---|
| 5,345,588 | A * | 9/1994 | Greenwood et al. | 718/107 |
| 5,628,016 | A * | 5/1997 | Kukol | 717/140 |
| 6,081,854 | A * | 6/2000 | Priem et al. | 710/37 |
| 6,301,699 | B1 | 10/2001 | Hollander et al. | |
| 6,578,094 | B1 | 6/2003 | Moudgill | |
| 6,832,302 | B1 * | 12/2004 | Fetzer et al. | 711/170 |
| 7,086,088 | B2 * | 8/2006 | Narayanan | 726/22 |
| 7,178,132 | B2 | 2/2007 | Pierce | |
| 2003/0172293 | A1 | 9/2003 | Johnson et al. | |
| 2005/0102493 | A1 | 5/2005 | DeWitt et al. | |
| 2007/0180524 | A1 | 8/2007 | Choi et al. | |

OTHER PUBLICATIONS

Satish et al., "Detecting Return-to-LIBC Buffer Overflows Via Dynamic Disassembly of Offsets", U.S. Appl. No. 11/064,712, filed Feb. 23, 2005.
Satish et al., "Detecting Buffer Overflows Using Frame Pointer Characteristics", U.S. Appl. No. 11/095,276, filed Mar. 30, 2005.

* cited by examiner

*Primary Examiner* — Vivek Srivastava
*Assistant Examiner* — Anthony Brown
(74) *Attorney, Agent, or Firm* — Gunnison, McKay & Hodgson, L.L.P.; Philip McKay (57) ABSTRACT

A method and system detect buffer overflows and RLIBC attacks by determining if a critical call initiating function is a "potential threat". In one embodiment, a critical call initiating function is considered a potential threat if the value of the return address of the critical call initiating function points to a location in memory between the location of the highest Thread Environment Block (TEB) or Process Environment Block (PEB) and the location of the lowest Thread Environment Block (TEB) or PEB. In another embodiment, a critical call initiating function making a call to a predefined critical operating system function is considered a potential threat if the value of the return address of the critical call initiating function points to the beginning of a new function with a zero offset.

5 Claims, 6 Drawing Sheets

METHOD TO IDENTIFY BUFFER OVERFLOWS AND RLIBC ATTACKS

BACKGROUND OF THE INVENTION

1. Field of the Invention

The present invention relates to the protection of computer systems. More particularly, the present invention relates to a system and method of detecting and preventing buffer overflows and Return-to-LIBC attacks.

2. Description of Related Art

Buffer overflow techniques have often been used by malicious hackers and virus writers to attack computer systems. Buffers are data storage areas that typically hold a predefined finite amount of data. A buffer overflow occurs when a program attempts to store more data into a buffer than the buffer can accommodate, i.e., the program attempts to store more than the predefined finite amount of data.

One category of buffer overflow, sometimes called stack-based buffer overflow, involves overwriting stack memory, sometimes called the stack. Stack-based buffer overflow is typically caused by programs that do not verify the length of the data being copied into a buffer.

When the data exceeds the size of the buffer, the extra data can overflow into the adjacent memory locations. In this manner, it is possible to corrupt valid data and possibly change the execution flow and instructions.

In the particular case of a Return-to-LIBC attack, hereinafter also referred to as a RLIBC attack, the attacker overflows the stack in such a way that a return address will be replaced to point to a library function in a loaded library inside the process address space. Thus, when the return address is used by the overflowed process, a library function will be executed. This way the attacker runs at least one call function, such as an Application Programming Interface (API), to make operating system function calls and run a command shell on the compromised system remotely.

SUMMARY OF THE INVENTION

A method according to one embodiment of the invention makes use of the fact that heap and stack overflows often use the Process Environment Block, hereinafter referred to as the PEB, or a Thread Environment Block, hereinafter referred to as TEB, for storage of shell code because the addresses of the PEB and TEB, and their associated memory space, are relatively fixed in the stack and are therefore predictable. In addition, it is believed by the inventors that there is no legitimate reason for any code to execute in these locations and the memory space associated with the PEB and TEB is typically used for non-execution purposes such as NLS data and Ansi/Unicode conversions.

According to one embodiment of the invention, two new variables are defined, MinEB and MaxEB. According to one embodiment of the invention, MinEB is defined as the address associated with the lowest TEB (or PEB) location in memory and MaxEB is defined as the address associated with the highest TEB (or PEB) location in memory. Of note is the fact that in some instances of the invention, where PEB is randomized, PEB can be at a lower address than the highest TEB.

According to one embodiment of the present invention, the method includes stalling a call to a predefined critical OS function and checking to see if the value of the return address of the critical call initiating function making the call to the critical OS function corresponds, or "points", to a location in the region of the stack between MinEB and MaxEB. According to one embodiment of the invention, if the return address of the critical call initiating function making the call to the critical OS function points to a location in the region of the stack between MinEB and MaxEB, the critical call initiating function making the call to the critical OS function is considered a "potential threat" and the method further includes taking protective action to protect the computer system. Consequently, according to this embodiment of the invention, the common technique used in heap overflows of using storage space on the PEB, as well as the "TEB buffer+RLBIC based string copy exploitation" is identified and defeated.

In another embodiment of the invention, the fact that shell code usually makes use of several chained functions or API's, i.e., sequences such as socket+connect+send), as opposed to using a single function or API, is used to identify potential RLBIC attacks. According to one embodiment of the invention, a method includes stalling a call to a critical OS function and the first "n" pointers beginning with the current critical call initiating function's return address are checked to determine if a return address or any of the parameters includes an address pointing to the beginning of a known function, i.e., to the beginning of a new function and a zero offset. According to one embodiment of the invention, the next "n" pointers are checked in the same manner. Consequently, using the this embodiment of present invention, a quick lookup is used to determine whether a potential RLIBC exists and only in the case where one of the pointers matches is any further action required.

BRIEF DESCRIPTION OF THE DRAWINGS

Common reference numerals are used throughout the drawings and detailed description to indicate like elements.

DETAILED DESCRIPTION

In the following discussion, call instructions are defined as instructions used to invoke a routine or function in a programming language. Calling a routine or function consists of specifying the routine or function name and, optionally, parameters. Calling a routine or function is referred to herein as the routine or function being "called" or "called by a call instruction". As an example, in a Windows® NT and Windows® 2000 environment the instruction "CALL" is a call instruction.

In addition, in the following discussion, a call function includes operating system function call instruction(s), i.e., the instruction, or set of instructions, that originates a call to an operating system function. Herein, the process whereby a call function originates a call to an operating system function is referred to as a "call to" an operating system function and the call function making a call to an operating system function is referred to as a "call initiating function". Call functions may be malicious or non-malicious. A parent application may include the call function, or, the parent application may itself be a call function. In addition, a function making a call to a critical OS function is referred to herein as a "critical call initiating function".

Figure 2:
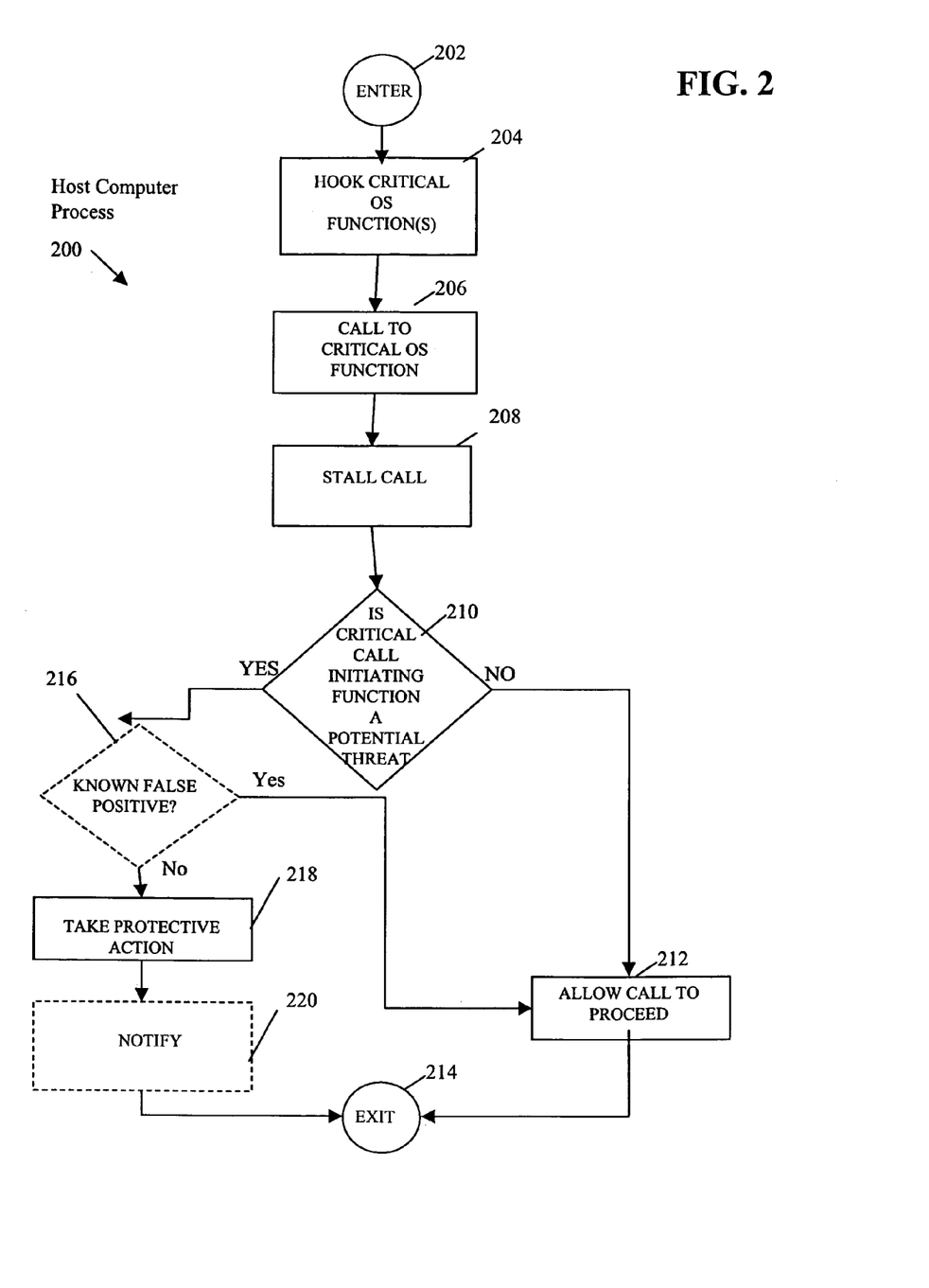
FIG. 2 is a flow diagram of a host computer process in accordance with one embodiment of the present invention including an IS CRITICAL CALL INITIATING FUNCTION A POTENTIAL THREAT? OPERATION.

Referring briefly to FIG. 2, according to the present invention, a method includes hooking critical OS functions (HOOK CRITICAL OS FUNCTION (S) OPERATION 204 in FIG. 2), stalling calls to critical OS functions (STALL CALL OPERATION 208 in FIG. 2) and checking to ensure that the critical OS function is not classified as a "potential threat" OS function by the methods of the present invention (IS CRITICAL CALL INITIATING FUNCTION A POTENTIAL THREAT? OPERATION 210). If it is determined that the critical OS function is not classified as a "potential threat" OS function by the methods of the present invention then the call to the critical OS function is allowed to proceed (ALLOW CALL TO PROCEED 212). If, on the other hand, the critical OS function is classified as a "potential threat" OS function by the methods of the present invention, then, in one embodiment of the invention, a determination is made as to whether the present critical OS function is a known false negative (KNOWN FALSE NEGATIVE? OPERATION 216). If the critical OS function is not a known false negative then the method of the invention includes taking protective action (TAKE PROTECTIVE ACTION OPERATION 218) and optionally, notice is sent out to the proper authorities (NOTIFY OPERATION 220).

Figure 4:
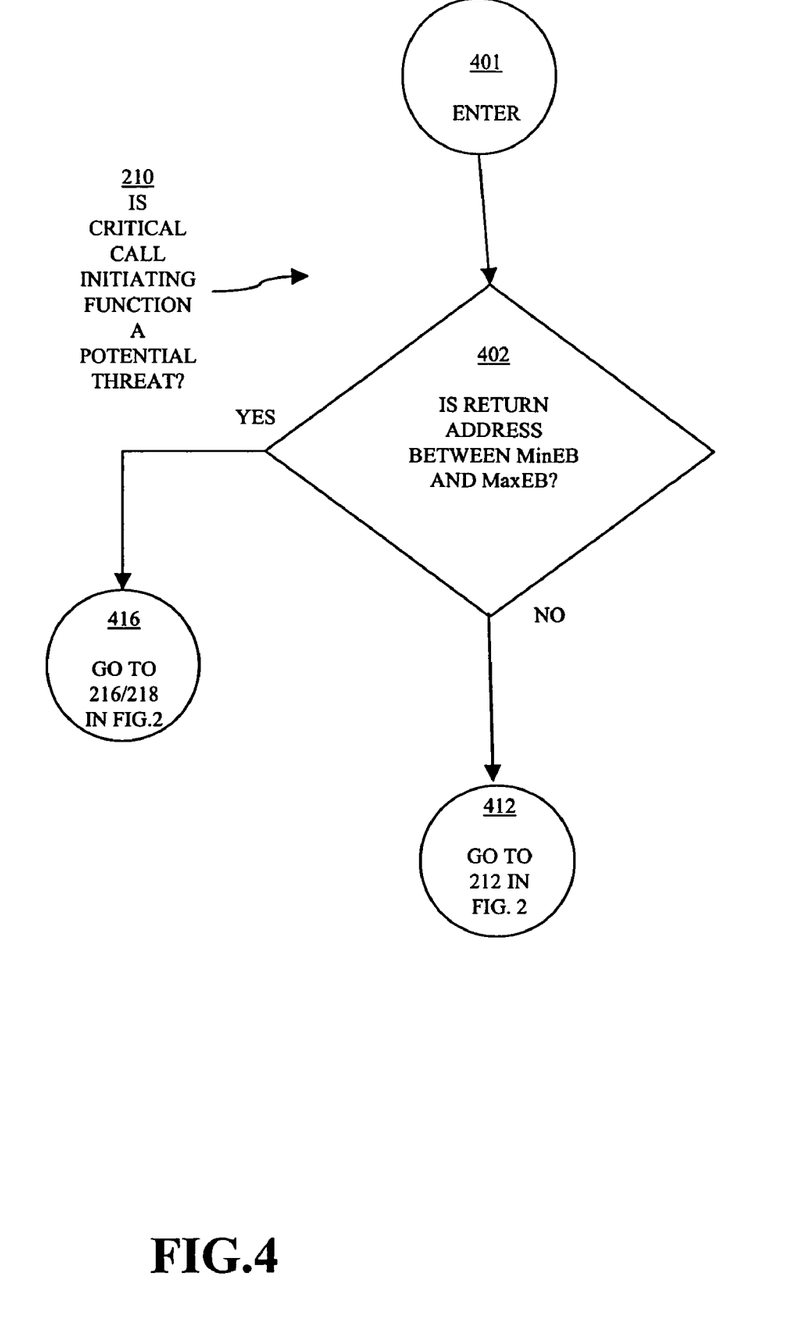
FIG. 4 is a flow diagram of one embodiment of the IS CRITICAL CALL INITIATING FUNCTION A POTENTIAL THREAT? OPERATION of the host computer process of FIG. 2 in which a determination is made as to whether the return address of the critical call initiating function corresponds, or "points", to a location in the region of the memory stack, or heap, between MinEB and MaxEB in accordance with one embodiment of the present invention.

Referring briefly to FIG. 4, one embodiment of the present invention makes use of the fact that heap and stack overflows often use the Process Environment Block, hereinafter referred to as the PEB, or a Thread Environment Block, hereinafter referred to as TEB, for storage of shell code because the addresses of the PEB and TEB, and their associated memory space, are relatively fixed in the stack and are therefore predictable.

According to one embodiment of the invention, two new variables are defined, MinEB and MaxEB. According to one embodiment of the invention, MinEB is defined as the address associated with the lowest TEB (or PEB) location in memory and MaxEB is defined as the address associated with the highest TEB (or PEB) location in memory.

According to one embodiment of the present invention, the method includes stalling a call to a predefined critical OS function and checking to see if the value of the return address of the critical call initiating function making the call to the critical OS function corresponds, or "points", to a location in the region of the stack between MinEB and MaxEB (IS RETURN ADDRESS BETWEEN MinEB AND MaxEB? OPERATION 402 in FIG. 4. According to one embodiment of the invention, if the return address of the critical call initiating function making the call to the critical OS function points to a location in the region of the stack between MinEB and MaxEB, the critical call initiating function making the call to the critical OS function is considered a "potential threat" and the method further includes taking protective action to protect the computer system. Consequently, according to this embodiment of the invention, the common technique used in heap overflows of using storage space on the PEB, as well as the "TEB buffer+RLIBC based string copy exploitation" is identified and defeated.

Figure 5:
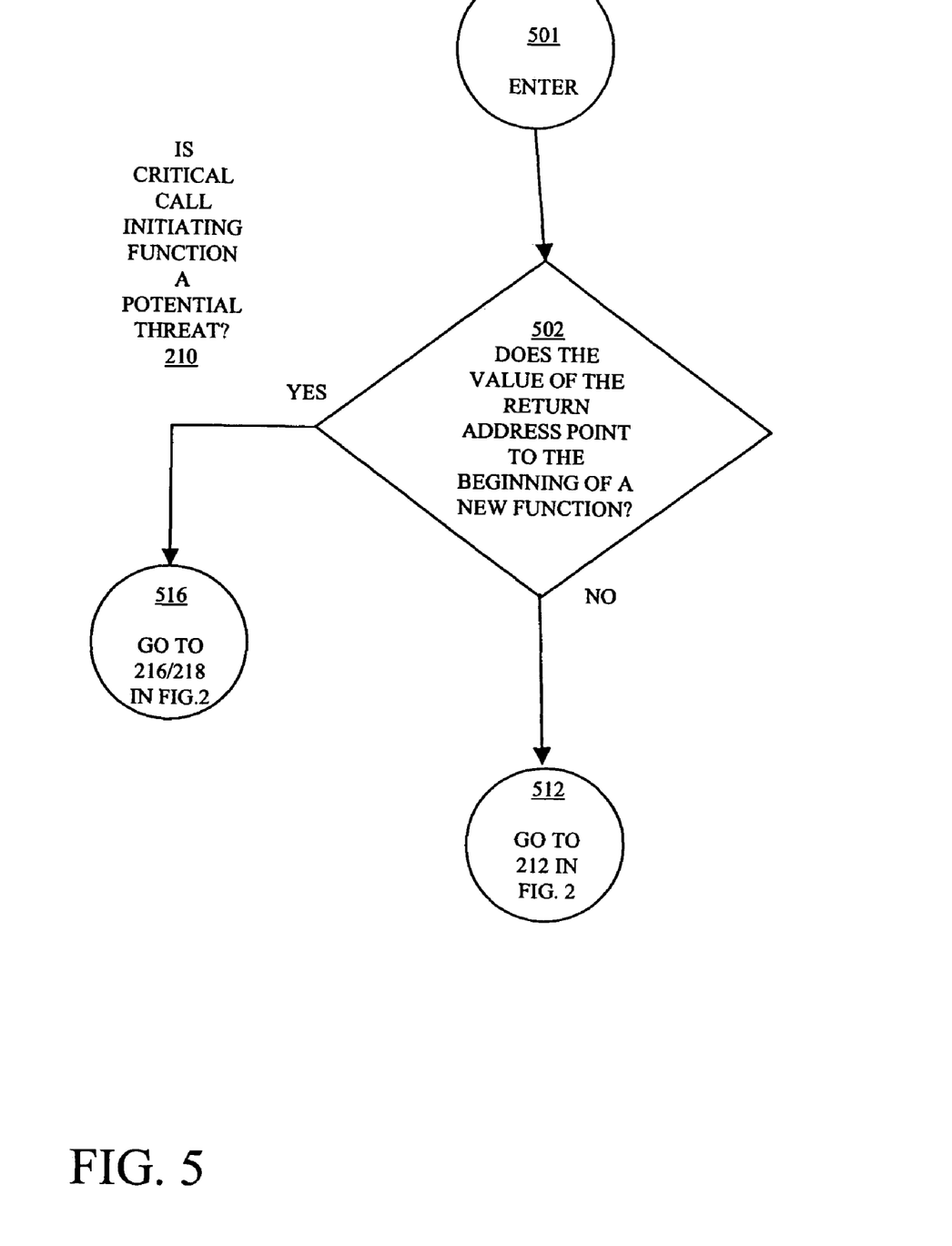
FIG. 5 is a flow diagram of one embodiment of the IS CRITICAL CALL INITIATING FUNCTION A POTENTIAL THREAT? OPERATION of the host computer process of FIG. 2 in which a determination is made as to whether the value of the return address of the critical call initiating function points to the beginning of a new function in accordance with one embodiment of the present invention.

Referring briefly to FIG. 5, according to the one embodiment of the present invention, a method includes stalling a call to a critical OS function and the first "n" pointers, beginning with the current critical call initiating function's return address, is checked to determine if it is an address pointing to the beginning of a known function, i.e., to the beginning of a new function and a zero offset (DOES THE VALUE OF THE RETURN ADDRESS OR ANY OF THE PARAMETERS POINT TO THE BEGINNING OF A NEW FUNCTION? OPERATION 502 IN FIG. 5). According to one embodiment of the invention, the next "n" pointers are checked in the same manner. Consequently, using this embodiment of present invention, a quick lookup is used to determine whether a potential RLIBC exists and only in the case where one of the pointers matches is any further action required.

Figure 1:
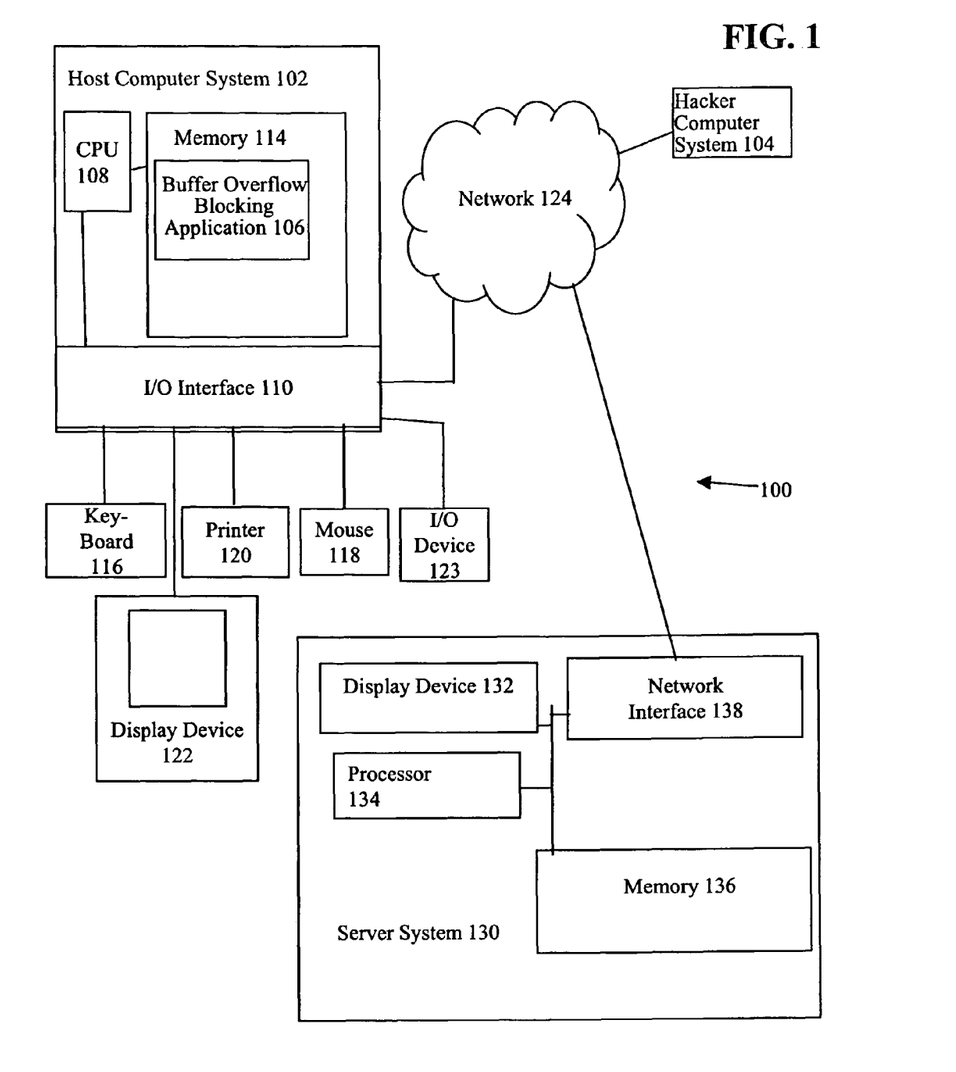
FIG. 1 is a diagram of a client-server system that includes a buffer overflow blocking application executing on a host computer system in accordance with one embodiment of the present invention.

More particularly, FIG. 1 is a diagram of a client-server system 100 that includes a buffer overflow blocking application 106 executing on a host computer system 102, e.g., a first computer system, in accordance with one embodiment of the present invention.

Host computer system 102, sometimes called a client or user device, typically includes a central processing unit (CPU) 108, hereinafter processor 108, an input/output (I/O) interface 110, and a memory 114. In one embodiment, memory 114 includes a page based virtual memory system that uses pages, e.g., memory areas.

For example, Windows® NT and Windows® 2000 are 32-bit operating systems widely used on home and business computer systems. Windows® NT and Windows® 2000 provide page-based virtual memory management schemes that permit programs to realize a 4 GB (gigabyte) virtual memory address space. In one embodiment, when processor 108 is running in virtual memory mode, all addresses are assumed to be virtual addresses and are translated, or mapped, to physical addresses each time processor 108 executes a new instruction to access memory.

Conventionally, the 4 GB virtual memory address space is divided into two parts: a lower 2 GB user address space, also referred to as user mode address space, or ring 3, available for use by a program; and, a high 2 GB system address space, also referred to as kernel address space, or ring 0, reserved for use by the operating system.

To protect the integrity of the operating system code, and other kernel address space code and data structures from errant or malicious programs, and to provide efficient system security (user rights management), Windows® NT and Windows® 2000 separate code executing in the user address space, e.g., user mode, from code executing in the kernel address space, e.g., kernel mode. User mode code typically does not have direct access to kernel mode code and has restricted access to computer system resources and hardware.

To utilize kernel mode code functionalities, such as access to disk drives and network connections, user mode programs utilize system calls, sometimes called operating system (OS) function calls, which interface between the user mode and kernel mode functions.

Host computer system 102 may further include standard devices like a keyboard 116, a mouse 118, a printer 120, and a display device 122, as well as, one or more standard input/output (I/O) devices 123, such as a compact disk (CD) or DVD drive, floppy disk drive, or other digital or waveform port for inputting data to and outputting data from host computer system 102. In one embodiment, buffer overflow blocking application 106 is loaded into host computer system 102 via I/O device 123, such as from a CD, DVD or floppy disk containing buffer overflow blocking application 106.

Host computer system 102 is coupled to a server system 130 of client-server system 100 by a network 124. Server system 130 typically includes a display device 132, a processor 134, a memory 136, and a network interface 138.

Further, host computer system 102 is also coupled to a hacker computer system 104 of client-server system 100 by network 124. In one embodiment, hacker computer system 104 is similar to host computer system 102 and, for example, includes a central processing unit, an input output (I/O) interface, and a memory. Hacker computer system 104 may further include standard devices like a keyboard, a mouse, a printer, a display device and an I/O device(s). The various hardware components of hacker computer system 104 are not illustrated to avoid detracting from the principals of the invention.

Network 124 can be any network or network system that is of interest to a user. In various embodiments, network interface 138 and I/O interface 110 include analog modems, digital modems, or a network interface card.

In one embodiment of the invention, buffer overflow blocking application 106 is typically stored in memory 114 of host computer system 102 and executed on host computer system 102. The particular type, and configuration, of host computer system 102, hacker computer system 104, and server system 130 are not essential to the present invention.

FIG. 2 is a flow diagram of a host computer process 200 in accordance with one embodiment of the present invention. Referring now to FIGS. 1 and 2 together, in one embodiment of the invention, execution of buffer overflow blocking application 106 by processor 108 results in the operations of host computer process 200 as described below.

From an ENTER OPERATION 202, flow moves to a HOOK CRITICAL OS FUNCTION (S) OPERATION 204. In one embodiment of the invention, ENTER OPERATION 202 takes place following previously conducted tests (not shown) that are used in conjunction with Host Computer Process 200 and are part of a chain of related tests. In HOOK CRITICAL OS FUNCTION (S) OPERATION 204, the critical operating system (OS) functions, e.g., at least one critical OS function, of host computer system 102 is/are hooked. In one embodiment, a system level, e.g., a kernel mode module or kernel mode driver, hooks the critical OS functions. Further, in one embodiment, a critical OS function is hooked by redirecting calls to the critical OS function to a hook module.

In one embodiment of the invention, an OS function is deemed critical if it is necessary for a first application, e.g., a parent application or critical call initiating function, to cause execution of a second application, e.g., a child application. In one particular embodiment, an OS function is deemed critical if it is necessary, or likely, to be used by a malicious parent application, e.g., an application which contains, or uses, malicious code, e.g., located on the stack, to execute a child application, where the child application allows remote access, e.g., remote system level access. Examples of child applications include the command prompt or "cmd.exe" on a Windows® operating system and "/bin/sh" on a UNIX or UNIX like, e.g., FreeBSD or MacOS x, operating system. As used herein, a child application is not dependent upon a parent application, i.e., once the child application is executed the parent application can be terminated without termination of the child application.

In one embodiment of the invention, typically run on a Windows® operating system, the CreateProcess ( ) and system ( ) are deemed critical OS functions. In yet another embodiment, critical OS functions are located in the C-library hence the name "Return-to-LIBC" attack.

As is well known to those of skill in the art, System calls expose all kernel functionality that user-mode programs require. User-mode programs need to utilize the functionality provided by the kernel, for example, to access disk drives, network connections, and shared memory. More particularly, because the processor prevents direct access to kernel mode functions by user-mode programs, user-mode programs use System calls, which form the only permitted interface between user-mode and kernel mode. In accordance with one embodiment of the invention, System calls include calls to critical OS functions and calls to non-critical OS function.

From HOOK CRITICAL OS FUNCTION(S) OPERATION 204, flow moves to a CALL TO CRITICAL OS FUNCTION OPERATION 206. In CALL TO CRITICAL OS FUNCTION OPERATION 206, a call to, sometimes called a call to critical OS function, or a critical OS function call, invoking a critical OS function is made by a call function of a parent application, also called a critical call initiating function. The parent application, and/or the critical call initiating function, may be malicious or non-malicious. More particularly, a call to a critical OS function is made by a critical call initiating function of a parent application to an OS function that was hooked in HOOK CRITICAL OS FUNCTION(S) OPERATION 204.

In accordance with one embodiment of the present invention, a call function includes the critical OS function call instruction(s), i.e., the instruction or set of instructions that originates the call to a critical OS function. Herein, the process whereby a call function originates a call to an operating system function is referred to as a "call to" an operating system function and the call function making a call to an operating system function, or a critical operating system function, is referred to as a critical call initiating function. The critical call initiating function may be malicious or non-malicious. The parent application may include the call function, or, in one embodiment, the parent application is the call function.

From CALL TO CRITICAL OS FUNCTION OPERATION 206, flow moves to a STALL CALL OPERATION 208. In STALL CALL OPERATION 208, the call to a critical OS function of CALL TO CRITICAL OS FUNCTION OPERATION 206 is stalled, i.e., is prevented from reaching the operating system. By stalling the call to the critical OS function, execution of the critical OS function is stalled.

From STALL CALL OPERATION 208, flow moves to an IS CRITICAL CALL INITIATING FUNCTION A POTENTIAL THREAT? OPERATION 210. In IS CRITICAL CALL INITIATING FUNCTION A POTENTIAL THREAT? OPERATION 210, a determination is made as to whether the critical call initiating function making the call to the critical OS function is classified as a "potential threat" function by the methods of the present invention.

If a determination is made in IS CRITICAL CALL INITIATING FUNCTION A POTENTIAL THREAT? OPERATION 210 that the critical call initiating function making the call to the critical OS function is not a "potential threat" function, then flow moves on to ALLOW CALL TO PROCEED OPERATION 212.

In ALLOW CALL TO PROCEED OPERATION 212, the call to the critical OS function is allowed to proceed. More particularly, the call to the critical OS function is passed to the operating system, or other tests (not shown) in a chain of related tests. As discussed above, the call to the critical OS function was stalled in STALL CALL OPERATION 208. From ALLOW CALL TO PROCEED OPERATION 212, flow moves to an EXIT OPERATION 214, or waits for the next call to a critical OS function and returns to CALL TO CRITICAL OS FUNCTION OPERATION 206.

In one embodiment of the invention, malicious code is defined as any computer program, module, set of modules, or code that enters a computer system without an authorized user's knowledge and/or without an authorized user's consent. A determination at IS CRITICAL CALL INITIATING FUNCTION A POTENTIAL THREAT? OPERATION 210 that the critical call initiating function making the call to the critical OS function is not a "potential threat" function does not necessarily mean that the critical call initiating function is not malicious code. This is because of the possibility of "false negative" results. Consequently, a "No" determination at IS CRITICAL CALL INITIATING FUNCTION A POTENTIAL THREAT? OPERATION 210, indicating that the critical call initiating function making the call to the critical OS function is not a "potential threat" function, according to one embodiment of the invention, is considered an indeterminate result and, in one embodiment of the invention, flow would proceed to ALLOW CALL TO PROCEED OPERATION 212, then to EXIT OPERATION 214, and then on to another test, or tests, (not shown) to try and make a more conclusive determination about the call to the critical OS function.

On the other hand, if a determination is made at IS CRITICAL CALL INITIATING FUNCTION A POTENTIAL THREAT? OPERATION 210 that the critical call initiating function making the call to a critical OS is a "potential threat" function, i.e. the results at IS CRITICAL CALL INITIATING FUNCTION A POTENTIAL THREAT? OPERATION 210 are "Yes", there is a good possibility that the critical call initiating function is the result of a buffer overflow, or is attempting to create a buffer overflow condition. Consequently, if the results at IS CRITICAL CALL INITIATING FUNCTION A POTENTIAL THREAT? OPERATION 210 are "Yes", the critical call initiating function, and the critical OS function call itself, become suspect, the method of the invention further includes taking action to protect host computer system 102 in FIG. 1, and flow moves, in FIG. 2, optionally, to a KNOWN FALSE NEGATIVE? OPERATION 216 (or directly to TAKE PROTECTIVE ACTION OPERATION 218, if KNOWN FALSE NEGATIVE? OPERATION 216 is not performed).

In KNOWN FALSE NEGATIVE? OPERATION 216, a determination is made as to whether the call to a critical OS function is a known "false negative". A known "false negative" call to a critical OS function is a call to a critical OS function that triggers a "Yes" result at IS CRITICAL CALL INITIATING FUNCTION A POTENTIAL THREAT? OPERATION 210, but is, in fact, safe, i.e., is not associated with malicious code. Illustratively, a user-defined or downloadable exclusion and/or inclusion list is used to determine whether the call to a critical OS function is a known "false negative".

If a determination is made in KNOWN FALSE NEGATIVE? OPERATION 216 that the call to a critical OS function is a known "false negative" call to a critical OS function, flow moves to ALLOW CALL TO PROCEED OPERATION 212, which is performed as discussed above, and EXIT OPERATION 214. Conversely, if a determination is made at KNOWN FALSE NEGATIVE? OPERATION 216 that the call to a critical OS function is not a known "false negative" call to a critical OS function, flow moves to a TAKE PROTECTIVE ACTION OPERATION 218.

In TAKE PROTECTIVE ACTION OPERATION 218, protective action is taken to prevent the malicious code of, or used by, the critical call initiating function from causing damage to, or exploiting, host computer system 102 in FIG. 1. For example, the call to a critical OS function is terminated. More particularly, the call to a critical OS function is not passed to the operating system but is terminated. As discussed above, the call to a critical OS function was stalled in STALL CALL OPERATION 208 in FIG. 2.

By terminating the call to a critical OS function, the malicious code of the critical call initiating function is prevented from exploiting and/or damaging host computer system 102 in FIG. 1. In one embodiment, by terminating the call to a critical OS function, the child application is prevented from being executed. By preventing execution of the child application, remote access is denied, thus preventing unauthorized access by malicious hackers as well as by replicating malware, e.g., worms.

As discussed above, if the results at IS CRITICAL CALL INITIATING FUNCTION A POTENTIAL THREAT? OPERATION 210 are "Yes", the critical call initiating function, as well as the critical OS function call itself, become suspect. By terminating the call to a critical OS function, the critical OS function is prevented from being executed. As another example of protective action, the parent application, including the call function and/or a malicious thread running within the context of the parent application, is terminated. Termination of applications is well known to those of skill in the art and so is not discussed further for clarity of discussion.

Returning to FIG. 2, flow moves from TAKE PROTECTIVE ACTION OPERATION 218, optionally, to a NOTIFY OPERATION 220 (or directly to EXIT OPERATION 214, if NOTIFY OPERATION 220 is not performed). In NOTIFY OPERATION 220, the user of host computer system 102 in FIG. 1, and/or the administrator, are notified that protective action has been taken on host computer system 102, e.g., that a call, a parent application and/or a call function have been terminated. The user and/or administrator can be notified using any one of a number of techniques, e.g., by using a pop up window, by generating an e-mail, by writing to a file and/or otherwise by logging the event. Further, a notification can be provided to a security center.

From NOTIFY OPERATION 220 in FIG. 2, flow moves to EXIT OPERATION 214 or waits for the next call to a critical OS function and returns to CALL TO CRITICAL OS FUNCTION OPERATION 206.

Figure 3:
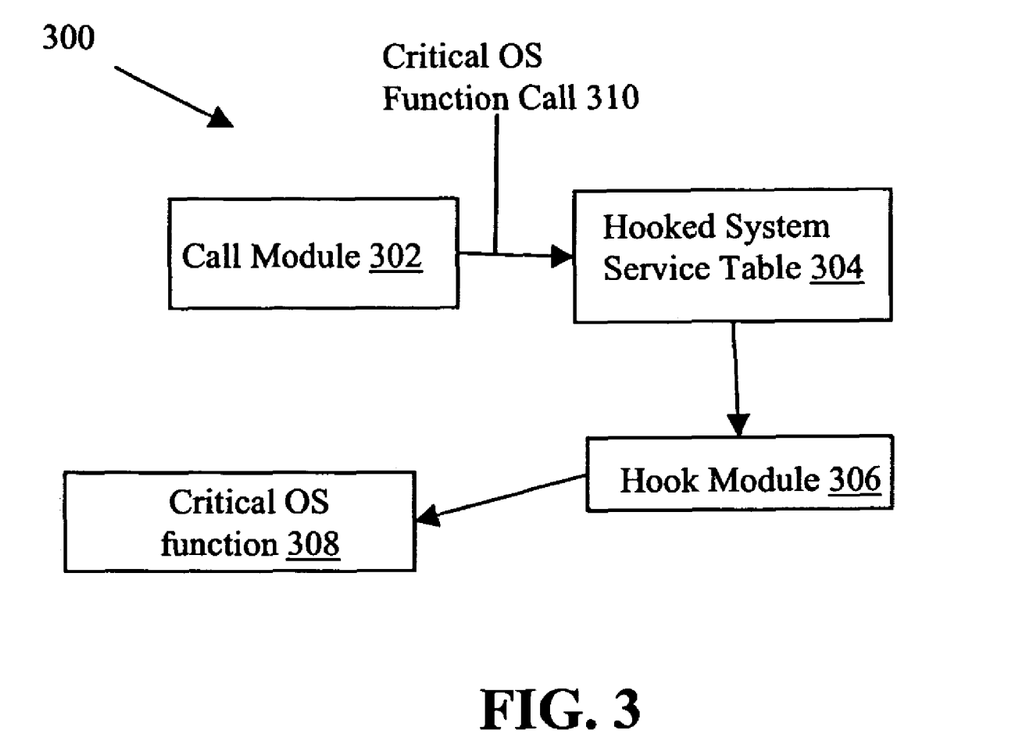
FIG. 3 is a diagram of a hooked operating system function call flow in accordance with one embodiment of the present invention.

FIG. 3 is a diagram of a hooked operating system function call flow 300 in accordance with one embodiment of the present invention. Referring now to FIGS. 2 and 3 together, a hook module 306 is used to hook calls to a critical OS function 308. In one embodiment, HOOK CRITICAL OS FUNCTION (S) OPERATION 204 is implemented using hook module 306, which is part of buffer overflow blocking application 106 (FIG. 1).

More particularly, in FIG. 3, a hooked system service table 304 routes calls to non-critical OS functions directly to the operating system (not shown). However, hooked system service table 304 routes calls to critical OS functions to hook module 306, e.g., a kernel mode module or kernel mode driver.

As is well known to those of skill in the art, a system service table, sometimes called a dispatch table or a system call table, relates system calls to specific addresses within the operating system kernel. Hooked system service table 304 in accordance with one embodiment of the present invention, redirects calls to critical OS functions to hook module 306 and from the specific addresses within the operating system kernel to which the calls to critical OS functions would otherwise be directed.

Although FIG. 3 describes one example of a hooked operating system function call path, in light of this disclosure, those of skill in the art will understand that other techniques can be used to hook operating system function(s). The particular technique used depends, for example, on the particular operating system.

In one embodiment, hook module 306 is used to stall a call to a critical OS function during STALL CALL OPERATION 208 of FIG. 2. Further, hook module 306 continues to stall calls to the critical OS function during IS CRITICAL CALL INITIATING FUNCTION A POTENTIAL THREAT? OPERATION 210, and KNOWN FALSE NEGATIVE? OPERATION 216, if performed. Hook module 306 allows the calls to a critical OS function to proceed to the operating system and thus to critical OS function 308 during ALLOW CALL TO PROCEED OPERATION 212. Conversely, hook module 306 terminates the call to a critical OS function and/or takes other protective action during TAKE PROTECTIVE ACTION OPERATION 218.

In accordance with this embodiment of the invention, a call to a critical OS function 310 originates from a call function 302 during CALL TO CRITICAL OS FUNCTION OPERATION 206. Critical OS function call 310 is routed by hooked system service table 304 to hook module 306. Critical OS function call 310 is stalled by hook module 306 in STALL CALL OPERATION 208.

Hooking and hooking operations are well known to those of skill in the art. Consequently, a more detailed discussion of hooking and hooking operations is omitted here to avoid detracting from the present invention.

Returning to FIG. 2, as discussed above, if the results at IS CRITICAL CALL INITIATING FUNCTION A POTENTIAL THREAT? OPERATION 210 are "YES", the critical call initiating function becomes suspect. According to one embodiment of the invention, IS CRITICAL CALL INITIATING FUNCTION A POTENTIAL THREAT? OPERATION 210 of host computer process 200 of FIG. 2 determines if the Process Environment Block, hereinafter referred to as the PEB, or a Thread Environment Block, hereinafter referred to as TEB is being used for storage of shell code.

Referring to FIG. 1, FIG. 2, and FIG. 4 together, FIG. 4 is a flow diagram of one embodiment of IS CRITICAL CALL INITIATING FUNCTION A POTENTIAL THREAT? OPERATION 210 of the host computer process of FIG. 2. The method of FIG. 4, according to one embodiment of the invention, makes use of the fact that heap and stack overflows often use the PEB, or TEB, and their associated memory space, for storage of shell code because the addresses of the PEB and TEB are relatively fixed in the stack and are therefore predictable. In addition, it is believed by the inventors that there is no legitimate reason for any code to execute in these locations. The storage space associated with the PEB and TEB is typically used for non-execution purposes such as NLS data and Ansi/Unicode conversions.

According to one embodiment of the invention, two new variables are defined, MinEB and MaxEB. According to one embodiment of the invention, MinEB is defined as the address associated with the lowest TEB (or PEB) location in memory and MaxEB is defined as the address associated highest TEB (or PEB) location in memory. Of note is the fact that in some instances of the invention, where PEB is randomized, PEB can be at a lower address than the highest TEB.

According to one embodiment of the present invention, a method includes stalling a call to a critical OS function at STALL CALL OPERATION 208 IN FIG. 2, as described above. Flow then moves from STALL CALL OPERATION 208 IN FIG. 2 to IS CRITICAL CALL INITIATING FUNCTION A POTENTIAL THREAT? OPERATION 210 and to ENTER OPERATION 401 in FIG. 401.

From ENTER OPERATION 401 flow moves to IS RETURN ADDRESS BETWEEN MinEB and MaxEB? OPERATION 402 where a determination is made as to whether the return address of the critical call initiating function making the call to the critical OS function corresponds, or "points", to a location in the region of the memory stack, or heap, between MinEB and MaxEB.

According to one embodiment of the invention, if at IS RETURN ADDRESS BETWEEN MinEB and MaxEB? OPERATION 402 it is determined that the return address of the critical call initiating function making the call to the critical OS function points to a location in the region of the stack, or heap, between MinEB and MaxEB, i.e., a "YES" result is found at IS FRAME POINTER BELOW TOP OF STACK? OPERATION 402, then the critical call initiating function making the call to the critical OS function is considered a "potential threat" and the method of the invention further includes taking action to protect the computer system as flow moves through GO TO 216/218 IN FIG. 2 OPERATION 416 to KNOWN FALSE NEGATIVE? OPERATION 216 (or directly to TAKE PROTECTIVE ACTION OPERATION 218, if KNOWN FALSE NEGATIVE? OPERATION 216 is not performed).

On the other hand, if at IS RETURN ADDRESS BETWEEN MinEB and MaxEB? OPERATION 402 it is determined that the return address of the critical call initiating function making the call to the critical OS function does not point to a location in the region of the stack, or heap, between MinEB and MaxEB i.e., a "NO" result is found at IS FRAME POINTER BELOW TOP OF STACK? OPERATION 402, the result is considered indeterminate, because of the possibility of "false negative" results, and flow moves through GO TO 212 IN FIG. 2 OPERATION 412 in FIG. 4 to ALLOW CALL TO PROCEED OPERATION 212 in FIG. 2.

Using the embodiment of the invention shown in FIG. 4, the common technique used in heap overflows of using storage space on the PEB, as well as the "TEB buffer+RLBIC based string copy exploitation" is identified and defeated.

In another embodiment of the invention, the fact that shell code usually makes use of several chained functions or API's, i.e., sequences such as socket+connect+send), as opposed to using a single function or API, is used to identify potential RLBIC attacks. RLIBC attacks typically allow for code execution by chaining return addresses together like this:

Overwritten stack frame of current function's caller
<Parameters to send>
<Parameters to connect>[EBP+4 . . . EBP+n]
ws2_32!send( )<-return address from connect [EBP]
<Parameters to socket>[EBP+4 . . . EBP+n]
ws2_32!connect( )<-return address from socket [EBP]
ws2_32!socket( )<-return address of current function In the example above, the attacker exploits a stack overflow and overwrites the current stack frame. The attacker: changes the return address to socket( ); overwrites the current function's parameters with the parameters to socket( ); sets the return address of socket( ) to be connect( ); and sets the return address of connect( ) to be send( ). Consequently, once the current function returns, the ret effective does "pop eip", which is the address of socket( ). Therefore, when socket starts executing, the return address is connect( ) as if there had been a call instruction to socket( ) from the instruction just before connect( ).

By chaining return addresses as shown above, the hacker can execute code by returning to addresses in shared libraries, such as DLLs, that are read-only and executable. This is where the term "Return to LIBC", or "RLBIC" comes from. One embodiment of the present invention makes use of the fact that, absent a RLIBC attack, connect( ) does not normally call socket and even if it did, the return address would not be at connect+0, i.e., offset zero and the beginning of new function, but at connect+<some offset into connect>. Consequently, according to one embodiment of the invention, the return address of the critical call initiating function is checked to see if the value of the return address equates to connect+0, i.e., a zero offset and the beginning of a new function.

Returning to FIG. 2, as discussed above, if the results at IS CRITICAL CALL INITIATING FUNCTION A POTENTIAL THREAT? OPERATION 210 are "YES", the critical call initiating function becomes suspect. According to one embodiment of the invention, IS CRITICAL CALL INITIATING FUNCTION A POTENTIAL THREAT? OPERATION 210 of host computer process 200 of FIG. 2 determines if the value of the return address or any of the parameters of the critical call initiating function points to connect+0, i.e., a zero offset and the beginning of a new function.

Referring to FIG. 1, FIG. 2, and FIG. 5 together, FIG. 5 is a flow diagram of one embodiment of IS CRITICAL CALL INITIATING FUNCTION A POTENTIAL THREAT? OPERATION 210 of the host computer process of FIG. 2. The method of FIG. 5, according to one embodiment of the invention, makes use of the fact, in an RLIBC attack, connect ( ) normally calls socket and/or the return address is typically at connect+0, i.e., offset zero and the beginning of new function.

According to one embodiment of the present invention, a method includes stalling a call to a critical OS function at STALL CALL OPERATION 208 IN FIG. 2, as described above. Flow then moves from STALL CALL OPERATION 208 IN FIG. 2 to IS CRITICAL CALL INITIATING FUNCTION A POTENTIAL THREAT? OPERATION 210 and to ENTER OPERATION 501 in FIG. 501.

From ENTER OPERATION 501 flow moves to DOES THE VALUE OF THE RETURN ADDRESS OR ANY OF THE PARAMETERS POINT TO THE BEGINNING OF A NEW FUNCTION? OPERATION 502 where a determination is made as to whether the value of the return address of the critical call initiating function or any of the parameters of the critical call initiating function points to the beginning of a new critical OS function.

According to one embodiment of the invention, the test DOES THE VALUE OF THE RETURN ADDRESS OR ANY OF THE PARAMETERS POINT TO THE BEGINNING OF A NEW FUNCTION? OPERATION 502 is not only applied to the current return address of the critical call initiating function, but also to the next n pointers on the stack starting with the bottom of the stack pointer, in one embodiment ESP. In most applications it is assumed n is <=8 so that ESP[0], ESP[4], ESP[8], i.e., the first dword, the second dword, the third dword etc. are checked. Those of skill in the art will readily recognize that the pointer size is architecture dependent. For instance, the pointer is 64-bit on AMD64 and 32-bit on x86.

According to one embodiment of the invention, each pointer is treated as an integer hash key into a hash table (not shown) that contains known function addresses, or, in one embodiment, a more limited list of "potential threat functions". Hash tables, hash keys and their use and operation is well known to those of skill in the art. Consequently, a more detailed discussion of hash tables and hash keys is omitted here to avoid detracting from the invention.

Of note is the fact that the method of the invention described above allows a quick lookup to determine whether there is a potential RLIBC while at the same time creating minimal performance impact. This is because, according to the invention, only in the case that one of the pointers matches a known function address are additional actions needed.

According tone embodiment of the invention, if one of the pointers matches a known function (e.g., CreateProcess, connect, send, etc.) DOES THE VALUE OF THE RETURN ADDRESS OR ANY OF THE PARAMETERS POINT TO THE BEGINNING OF A NEW FUNCTION? OPERATION 502, it means one of the following:

1. The address of a function such as CreateProcess( ) is being passed as a parameter to a function if the dword occurs within the current stack frame—a non-potential threat;

2. The address of a function is stored in a local variable in the stack frame of the previous function—also a non-potential threat; or 3. The stack has been overflowed and the address of the function is part of a chained sequence of function calls being used for an RLIBC attack—clearly a potential threat.

The first case, i.e., the case where the address of a function such as CreateProcess( ) is being passed as a parameter to a function if the dword occurs within the current stack frame only makes sense if the function takes a function return address as an argument (e.g., CreateThread). According to one embodiment of the present invention, it is assumed this does not happen very often, thus it is assumed this is actually the third case, i.e., the stack has been overflowed and the address of the function is part of a chained sequence of function calls being used for an RLIBC attack and then, according to one embodiment of the invention, exceptions are added as needed. In one embodiment of the invention, this situation avoided if the parameters to the function are known and it is known in advance that it doesn't take a function pointer.

The second case, i.e., the address of a function is stored in a local variable in the stack frame of the previous function, is more common, especially if a function is dynamically loading functions using GetProcAddress( ) and storing the result in a local variable. Consequently, the method of the invention must distinguish an RLIBC attack from the second case.

To accomplish this, one embodiment of the invention makes use of the fact that shell code typically uses not one, but several chained functions or APIs (e.g., sequences such as socket+connect+send). Consequently, according to one embodiment of the present invention, if the first n pointers, starting with the current function's return address, contain the address of a "known function", the next "n" pointers after that are checked. If there is no further match, it is assumed the match was the first case, i.e., the address of a critical function such as CreateProcess ( ) is being passed as a parameter to a function if the dword occurs within the current stack frame, and execution is allowed to continue.

On the other hand, if another pointer matches a known function, according to one embodiment of the invention, the method can either consider the code malicious, i.e., designate the critical call initiating function a "potential threat" or check the next n pointers after that. The threshold number of pointer matches required to designate a function as a "potential threat" is predetermined and chosen by the user depending on how conservative the user of the present invention wants to be on reporting RLIBC attacks.

According to one embodiment of the invention, if DOES THE VALUE OF THE RETURN ADDRESS OR ANY OF THE PARAMETERS POINT TO THE BEGINNING OF A NEW FUNCTION? OPERATION 502 the predetermined threshold number of matches is found, i.e., a "YES" result is found at DOES THE VALUE OF THE RETURN ADDRESS OR ANY OF THE PARAMETERS POINT TO THE BEGINNING OF A NEW FUNCTION? OPERATION 502, then the critical call initiating function making the call to the critical OS function is considered a "potential threat" and the method of the invention further includes taking action to protect the computer system as flow moves through GO TO 216/218 IN FIG. 2 OPERATION 516 to KNOWN FALSE NEGATIVE? OPERATION 216 (or directly to TAKE PROTECTIVE ACTION OPERATION 218, if KNOWN FALSE NEGATIVE? OPERATION 216 is not performed).

On the other hand, if at DOES THE VALUE OF THE RETURN ADDRESS OR ANY OF THE PARAMETERS POINT TO THE BEGINNING OF A NEW FUNCTION? OPERATION 502 the predetermined threshold number of matches is not found, i.e., a "NO" result is found at DOES THE VALUE OF THE RETURN ADDRESS OR ANY OF THE PARAMETERS POINT TO THE BEGINNING OF A NEW FUNCTION? OPERATION 502, the result is considered indeterminate, because of the possibility of "false negative" results, and flow moves through GO TO 212 IN FIG. 2 OPERATION 512 in FIG. 5 to ALLOW CALL TO PROCEED OPERATION 212 in FIG. 2.

Returning to FIG. 2, as discussed above, if the results at IS CRITICAL CALL INITIATING FUNCTION A POTENTIAL THREAT? OPERATION 210 are "YES", the critical call initiating function becomes suspect. According to one embodiment of the invention, IS CRITICAL CALL INITIATING FUNCTION A POTENTIAL THREAT? OPERATION 210 of host computer process 200 of FIG. 2 uses both tests 402 and 502 discussed above.

Figure 6:
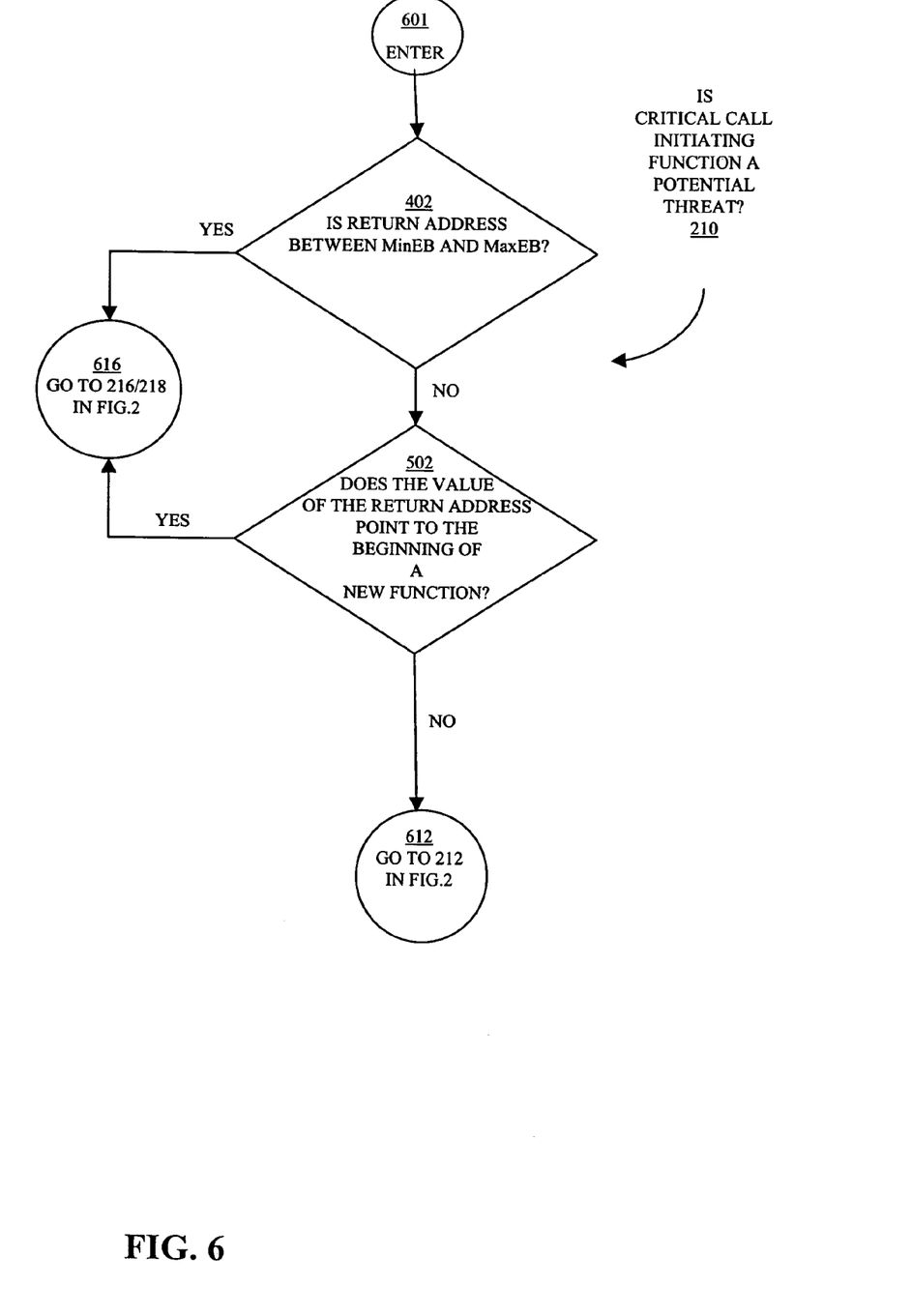
FIG. 6 is a flow diagram of one embodiment of the IS CRITICAL CALL INITIATING FUNCTION A POTENTIAL THREAT? OPERATION of the host computer process of FIG. 2 in which a determination is made as to whether the return address of the critical call initiating function corresponds, or "points", to a location in the region of the memory stack, or heap, between MinEB and MaxEB and a determination is made as to whether the value of the return address of the critical call initiating function points to the beginning of a new function in accordance with one embodiment of the present invention.

Referring to FIG. 1, FIG. 2 and FIG. 6 together, FIG. 6 is a flow diagram of one embodiment of IS CRITICAL CALL INITIATING FUNCTION A POTENTIAL THREAT? OPERATION 210 of the host computer process of FIG. 2.

According to one embodiment of the present invention, a method includes stalling a call to a critical OS function at STALL CALL OPERATION 208 IN FIG. 2, as described above. Flow then moves from STALL CALL OPERATION 208 IN FIG. 2 to IS CRITICAL CALL INITIATING FUNCTION A POTENTIAL THREAT? OPERATION 210 and to ENTER OPERATION 601 in FIG. 4.

From ENTER OPERATION 601 flow moves to IS RETURN ADDRESS BETWEEN MinEB and MaxEB? OPERATION 402 where a determination is made as to whether the return address of the critical call initiating function making the call to the critical OS function corresponds, or "points", to a location in the region of the memory stack, or heap, between MinEB and MaxEB.

According to one embodiment of the invention, if at IS RETURN ADDRESS BETWEEN MinEB and MaxEB? OPERATION 402 it is determined that the return address of the critical call initiating function making the call to the critical OS function points to a location in the region of the stack, or heap, between MinEB and MaxEB, i.e., a "YES" result is found at IS FRAME POINTER BELOW TOP OF STACK? OPERATION 402, then the critical call initiating function making the call to the critical OS function is considered a "potential threat" and the method of the invention further includes taking action to protect the computer system as flow moves through GO TO 216/218 IN FIG. 2 OPERATION 616 to KNOWN FALSE NEGATIVE? OPERATION 216 (or directly to TAKE PROTECTIVE ACTION OPERATION 218, if KNOWN FALSE NEGATIVE? OPERATION 216 is not performed).

On the other hand, if at IS RETURN ADDRESS BETWEEN MinEB and MaxEB? OPERATION 402 it is determined that the return address of the critical call initiating function making the call to the critical OS function does not point to a location in the region of the stack, or heap, between MinEB and MaxEB i.e., a "NO" result is found at IS FRAME POINTER BELOW TOP OF STACK? OPERATION 402, the result is considered indeterminate, because of the possibility of "false negative" results, and flow moves to DOES THE VALUE OF THE RETURN ADDRESS OR ANY OF THE PARAMETERS POINT TO THE BEGINNING OF A NEW FUNCTION? OPERATION 502 where a determination is made as to whether the value of the return address of the critical call initiating function or any of the parameters of the critical call initiating function points to the beginning of a new critical OS function.

As discussed above, according to one embodiment of the invention, the test DOES THE VALUE OF THE RETURN ADDRESS OR ANY OF THE PARAMETERS POINT TO THE BEGINNING OF A NEW FUNCTION? OPERATION 502 is not only applied to the current return address of the critical call initiating function, but also to the next n pointers on the stack starting with the bottom of the stack pointer, in one embodiment ESP. In most applications it is assumed n is <=8 so that ESP[0], ESP[4], ESP[8], i.e., the first dword, the second dword, the third dword etc. are checked. Those of skill in the art will readily recognize that the pointer size is architecture dependent. For instance, the pointer is 64-bit on AMD64 and 32-bit on x86.

As discussed above, according to one embodiment of the invention, each pointer is treated as an integer hash key into a hash table (not shown) that contains known function addresses, or, in one embodiment, a more limited list of "potential threat functions"). Hash tables, hash keys and their use and operation is well known to those of skill in the art. Consequently, a more detailed discussion of hash tables and hash keys is omitted here to avoid detracting from the invention.

As discussed above, according to one embodiment of the invention, if DOES THE VALUE OF THE RETURN ADDRESS OR ANY OF THE PARAMETERS POINT TO THE BEGINNING OF A NEW FUNCTION? OPERATION 502 a predetermined threshold number of matches is found, i.e., a "YES" result is found at DOES THE VALUE OF THE RETURN ADDRESS OR ANY OF THE PARAMETERS POINT TO THE BEGINNING OF A NEW FUNCTION? OPERATION 502, then the critical call initiating function making the call to the critical OS function is considered a "potential threat" and the method of the invention further includes taking action to protect the computer system as flow moves through GO TO 216/218 IN FIG. 2 OPERATION 616 to KNOWN FALSE NEGATIVE? OPERATION 216 (or directly to TAKE PROTECTIVE ACTION OPERATION 218, if KNOWN FALSE NEGATIVE? OPERATION 216 is not performed).

On the other hand, if at DOES THE VALUE OF THE RETURN ADDRESS OR ANY OF THE PARAMETERS POINT TO THE BEGINNING OF A NEW FUNCTION?

OPERATION 502 the predetermined threshold number of matches is not found, i.e., a "NO" result is found at DOES THE VALUE OF THE RETURN ADDRESS OR ANY OF THE PARAMETERS POINT TO THE BEGINNING OF A NEW FUNCTION? OPERATION 502, the result is considered indeterminate, because of the possibility of "false negative" results, and flow moves through GO TO 212 IN FIG. 2 OPERATION 612 in FIG. 5 to ALLOW CALL TO PROCEED OPERATION 212 in FIG. 2.

Referring again to FIG. 1, in one embodiment of the invention, buffer overflow blocking application 106 is in computer memory 114. As used herein, a computer memory refers to a volatile memory, a non-volatile memory, or a combination of the two.

Although buffer overflow blocking application 106 is referred to as an application, this is illustrative only. Buffer overflow blocking application 106 should be capable of being called from an application or the operating system. In one embodiment, an application is generally defined to be any executable code. Moreover, those of skill in the art will understand that when it is said that an application or an operation takes some action, the action is the result of executing one or more instructions by a processor. In one embodiment, buffer overflow blocking application 106 is implemented as a system level, e.g., kernel mode driver.

While embodiments in accordance with the present invention have been described for a client-server configuration, an embodiment of the present invention may be carried out using any suitable hardware configuration or means involving a personal computer, a workstation, a portable device, or a network of computer devices. Other network configurations other than client-server configurations, e.g., peer-to-peer, web-based, intranet, internet network configurations, are used in other embodiments.

Herein, a computer program product comprises a medium configured to store or transport computer readable code in accordance with an embodiment of the present invention. Some examples of computer program products are CD-ROM discs, DVDs, ROM cards, floppy discs, magnetic tapes, computer hard drives, servers on a network and signals transmitted over a network representing computer readable code.

As illustrated in FIG. 1, this medium may belong to the computer system itself. However, the medium also may be removed from the computer system. For example, buffer overflow blocking application 106 may be stored in memory 136 that is physically located in a location different from processor 108. Processor 108 should be coupled to the memory 136. This could be accomplished in a client-server system, or alternatively via a connection to another computer via modems and analog lines, or digital interfaces and a digital carrier line.

More specifically, in one embodiment, host computer system 102 and/or server system 130 is a portable computer, a workstation, a two-way pager, a cellular telephone, a digital wireless telephone, a personal digital assistant, a server computer, an Internet appliance, or any other device that includes components that can execute the Return-to-LIBC attack blocking functionality in accordance with at least one of the embodiments as described herein. Similarly, in another embodiment, host computer system 102 and/or server system 130 is comprised of multiple different computers, wireless devices, cellular telephones, digital telephones, two-way pagers, or personal digital assistants, server computers, or any desired combination of these devices that are interconnected to perform, the methods as described herein.

In view of this disclosure, the buffer overflow blocking functionality in accordance with one embodiment of present invention can be implemented in a wide variety of computer system configurations. In addition, the buffer overflow blocking functionality could be stored as different modules in memories of different devices. For example, buffer overflow blocking application 106 could initially be stored in server system 130, and then as necessary, a portion of buffer overflow blocking application 106 could be transferred to host computer system 102 and executed on host computer system 102. Consequently, part of the buffer overflow blocking functionality would be executed on processor 134 of server system 130, and another part would be executed on processor 108 of host computer system 102. In view of this disclosure, those of skill in the art can implement various embodiments of the present invention in a wide-variety of physical hardware configurations using an operating system and computer programming language of interest to the user.

In yet another embodiment, buffer overflow blocking application 106 is stored in memory 136 of server system 130. Buffer overflow blocking application 106 is transferred over network 124 to memory 114 in host computer system 102. In this embodiment, network interface 138 and I/O interface 110 would include analog modems, digital modems, or a network interface card. If modems are used, network 124 includes a communications network, and buffer overflow blocking application 106 is downloaded via the communications network.

This disclosure provides exemplary embodiments of the present invention. The scope of the present invention is not limited by these exemplary embodiments. For example, for illustrative purposes, specific operations, and flow of operations, were described above and set forth in the FIG.s. However, those of skill in the art will readily recognize that the operations, and flow of operations, can be varied to meet the specific user's needs and to accommodate differing implementations of the invention.

Consequently, numerous variations, whether explicitly provided for by the specification or implied by the specification or not, may be implemented by one of skill in the art in view of this disclosure.

What is claimed is:

1. A computer system implemented method for blocking a buffer overflow comprising:
 a computer system;
 a memory associated with the computer system;
 a processor associated with the computer system, the processor associated with the computer system executing instructions for implementing at least part of the computer system implemented method for blocking a buffer overflow, the computer system implemented method for blocking a buffer overflow comprising:
 stalling a call to a critical operating system (OS) function, said call to a critical operating system (OS) function being made by a critical call initiating function residing in the memory associated with the computer system;
 determining whether a value of a return address of said critical call initiating function points to a location in said memory associated with the computer system that corresponds to a location in a Thread Environment Block (TEB) or a Process Environment Block (PEB) of said memory associated with the computer system;
 taking protective action to protect the computer system upon a determination that said return address of said critical call initiating function does point to a location in a Thread Environment Block (TEB) or a Process Environment Block (PEB) of said memory associated with the computer system; and allowing said call to a critical operating system (OS) function to proceed upon a determination that said return address of said critical call initiating function does not point to a location in a Thread Environment Block (TEB) or a Process Environment Block (PEB) of said memory associated with the computer system.

2. The computer system implemented method for blocking a buffer overflow of claim 1 wherein said taking protective action comprises terminating said call to a critical operating system (OS) function.

3. A system comprising:
- a computer system;
- a memory associated with the computer system;
- a processor associated with the computer system,
- means for stalling a call to a critical operating system (OS) function, said call to a critical operating system (OS) function being made by a critical call initiating function residing in the memory associated with the computer system;
- means for determining whether a value of a return address of said critical call initiating function points to a location in said memory associated with the computer system that corresponds to a location in a Thread Environment Block (TEB) or a Process Environment Block (PEB) of said memory associated with the computer system;
- means for taking protective action to protect the computer system upon a determination that said return address of said critical call initiating function does point to a location in a Thread Environment Block (TEB) or a Process Environment Block (PEB) of said memory associated with the computer system; and
- means for allowing said call to a critical operating system (OS) function to proceed upon a determination that said return address of said critical call initiating function does not point to a location in a Thread Environment Block (TEB) or a Process Environment Block (PEB) of said memory associated with the computer system.

4. The system of claim 3 wherein said taking protective action comprises terminating said call to a critical operating system (OS) function.

5. A computer system implemented method for blocking a buffer overflow comprising:
- a computer system;
- a memory associated with the computer system;
- a processor associated with the computer system, the processor associated with the computer system executing instructions for implementing at least part of the computer system implemented method for blocking a buffer overflow, the computer system implemented method for blocking a buffer overflow comprising:
- stalling a call to a critical operating system (OS) function, the critical call operating system function being an operating system function necessary for a first application to cause execution of a second application, said call to a critical operating system (OS) function being made by a critical call initiating function residing in a the memory associated with the computer system;
- determining whether a value of a return address of said critical call initiating function points to a location in said memory associated with the computer system that corresponds to a location in a Thread Environment Block (TEB) or a Process Environment Block (PEB) of said memory associated with the computer system;
- taking protective action to protect the computer system upon a determination that said return address of said critical call initiating function does point to a location in a Thread Environment Block (TEB) or a Process Environment Block (PEB) of said memory associated with the computer system; and
- allowing said call to a critical operating system (OS) function to proceed upon a determination that said return address of said critical call initiating function does not point to a location in a Thread Environment Block (TEB) or a Process Environment Block (PEB) of said memory associated with the computer system.

* * * * *